US011993137B2

(12) United States Patent
Charbonnel et al.

(10) Patent No.: US 11,993,137 B2
(45) Date of Patent: May 28, 2024

(54) LAND VEHICLE WITH TECHNICAL HATCH

(71) Applicant: SpeedInnov, Paris (FR)

(72) Inventors: Fabrice Charbonnel, Thaire (FR);
Philippe Montigaud, La Rochelle (FR);
Daniel Perin, Saint-Rogatien (FR)

(73) Assignee: SpeedInnov, Paris (FR)

( * ) Notice: Subject to any disclaimer, the term of this patent is extended or adjusted under 35 U.S.C. 154(b) by 239 days.

(21) Appl. No.: 17/643,376

(22) Filed: Dec. 8, 2021

(65) Prior Publication Data
US 2022/0185080 A1 Jun. 16, 2022

(30) Foreign Application Priority Data

Dec. 11, 2020 (FR) ..................................... 20 13105

(51) Int. Cl.
*B60J 5/04* (2006.01)
(52) U.S. Cl.
CPC ....... *B60J 5/0491* (2013.01); *B60Y 2200/143* (2013.01)
(58) Field of Classification Search
CPC ..... B60J 5/0491; B61D 19/007; B61D 19/004
USPC ...................................................... 296/24.45
See application file for complete search history.

(56) References Cited

U.S. PATENT DOCUMENTS

| 3,492,042 | A | * | 1/1970 | Nachtigall, Jr. | ..... B62D 63/061 296/26.02 |
| 5,192,108 | A |   | 3/1993 | Richardson et al. | |
| 10,269,273 | B1 | * | 4/2019 | Borden | ............... E04B 1/34336 |
| 11,352,073 | B2 | * | 6/2022 | Butler | ....................... B60R 9/02 |
| 2009/0313904 | A1 |   | 12/2009 | Kerr et al. | |
| 2013/0216344 | A1 |   | 8/2013 | Uetake | |
| 2019/0106046 | A1 | * | 4/2019 | Coon | ......................... B60J 5/06 |

FOREIGN PATENT DOCUMENTS

| DE | 10 2015 218872 B3 | 2/2017 | |
| DE | 102015218872 B3 * | 2/2017 | ............. B61D 35/00 |
| EP | 4067137 A1 * | 10/2022 | |
| JP | H11115494 A * | 4/1999 | |

OTHER PUBLICATIONS

French Search Report issued for French Patent Application No. FR 20 13105, dated Jul. 22, 2021 in 2 pages.

* cited by examiner

*Primary Examiner* — Jason S Morrow
(74) *Attorney, Agent, or Firm* — Knobbe, Martens, Olson & Bear, LLP

(57) ABSTRACT

A land vehicle includes a body, a technical compartment opening onto an outer wall of the body; and a closing device that closes the technical compartment. The closing device includes first and second flaps, which are rotatable relative to the body, and a central element, which is connected to the body between the flaps. In a closed configuration of the closing device, each of the flaps extends in a longitudinal direction with one end of each in contact with the central element, so that the flaps close the technical compartment. In an open configuration of the closing device, both of the flaps folded against the outer wall or against the central element, so as to provide access to the technical compartment.

9 Claims, 2 Drawing Sheets

LAND VEHICLE WITH TECHNICAL HATCH

CROSS-REFERENCE TO RELATED APPLICATION

This application claims priority to French Patent Application No. 20 13105 filed on Dec. 11, 2020, the disclosure of which including the specification, the drawings, and the claims is hereby incorporated by reference in its entirety.

FIELD OF THE INVENTION

The present invention relates to a land vehicle, of the type comprising: a body, said body comprising: a substantially vertical outer wall, said outer wall extending in a horizontal longitudinal direction; a technical compartment opening onto said outer wall; and at least one closing device capable of reversibly closing the technical compartment, said closing device being movable between an open configuration and a closed configuration.

The invention is particularly applicable to rail vehicles, such as trains or trams, but also to road vehicles such as buses.

BACKGROUND OF THE INVENTION

Rail vehicles are commonly equipped with hatches to access technical compartments. Such hatches are formed by openings in the walls of the vehicle, said openings being closed by doors or flaps.

In a known way, the flaps are hinged to the vehicle walls along a horizontal axis. If a flap is opened accidentally while the vehicle is in motion, the space requirement generated by the flap may exceed a limit provided for in the vehicle's traffic regulations. Exceeding this limit can lead to accidents, especially with people on a station platform.

SUMMARY OF THE INVENTION

The aim of the present invention is to limit the risk of accidents due to such overrunning, while allowing quick and easy access to the technical compartments of the vehicle.

To this end, the invention has as its object a land vehicle of the aforementioned type, wherein: the closing device comprises: a first and a second flap, aligned in the longitudinal direction; each flap being rotatable with respect to the outer wall of the body, along a substantially vertical axis; and a central element, assembled to the body, said central element being disposed between the first and the second flap in the longitudinal direction; in the closed configuration of the closing device, both the first and second flaps extend in the longitudinal direction, a first and a second end of each of the said flaps in the said longitudinal direction being in contact respectively with the outer wall of the body and the central element, said first and second flaps and the central element thus closing off the technical compartment; and in the open configuration of the closing device, both the first and second flaps are capable of being folded back against the outer wall or against the central element, so as to give access to the technical compartment.

According to other advantageous aspects of the invention, the land vehicle comprises one or more of the following features taken in isolation or in any combination that is technically possible:

the central element of the closing device is removably attached to the outer wall of the body;

the central element of the closing device is hinged to the outer wall along a preferably horizontal axis;

at least one of the first and second flaps is hinged to the central element;

the at least one flap hinged to the central element has a removable attachment element to the outer wall of the body;

at least one of the first and second flaps is hinged to the outer wall of the body;

the at least one flap hinged to the outer wall has a removable attachment element to the central element;

the central element is a panel;

the central element is a beam;

at least one of the first or second flaps and/or the central element has air vents for the technical compartment.

BRIEF DESCRIPTION OF THE DRAWINGS

The invention will be better understood upon reading the following description, given only as a non-limiting example, and with reference to the attached drawings, in which.

DETAILED DESCRIPTION OF THE PREFERRED EMBODIMENTS

Figure 1:
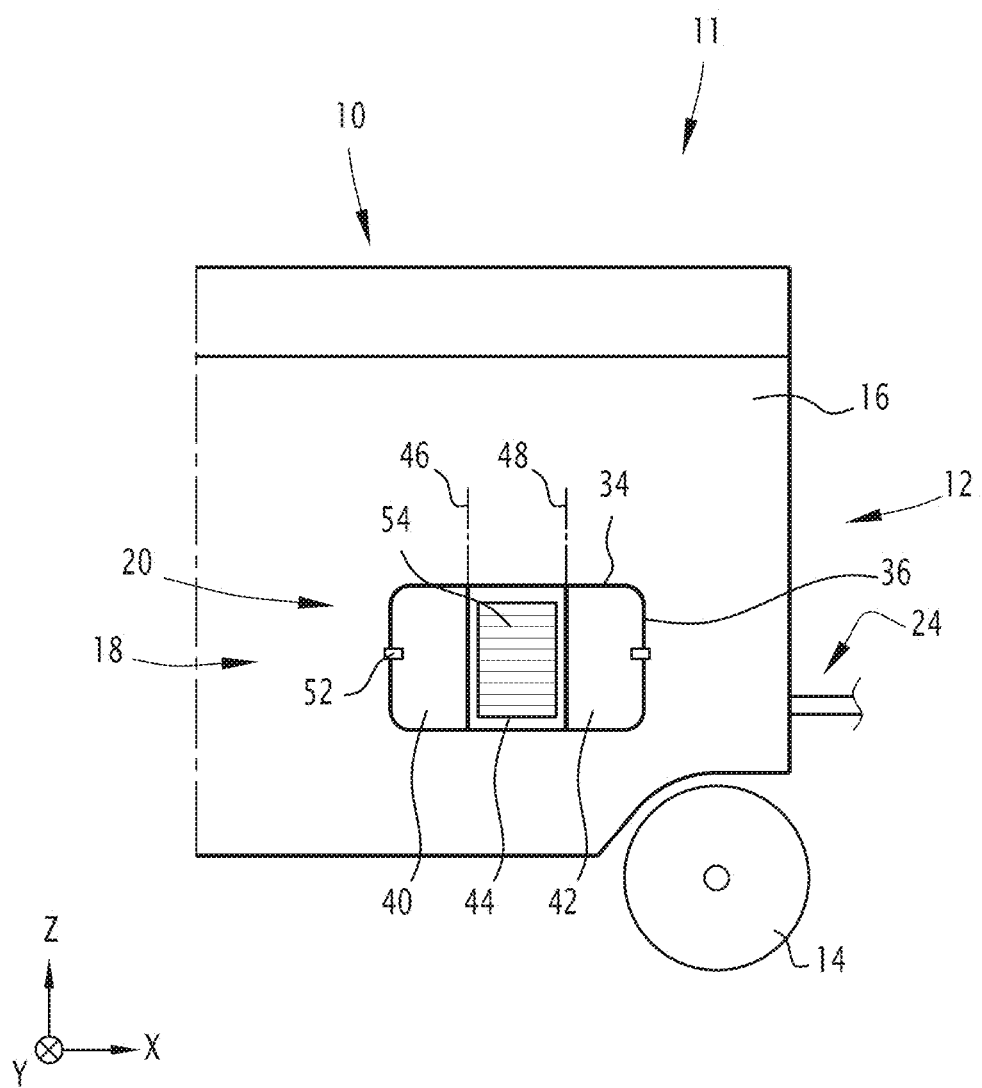
FIG. 1 is a lateral schematic view of a land vehicle according to a first embodiment of the invention, in a first configuration.
Figure 2:
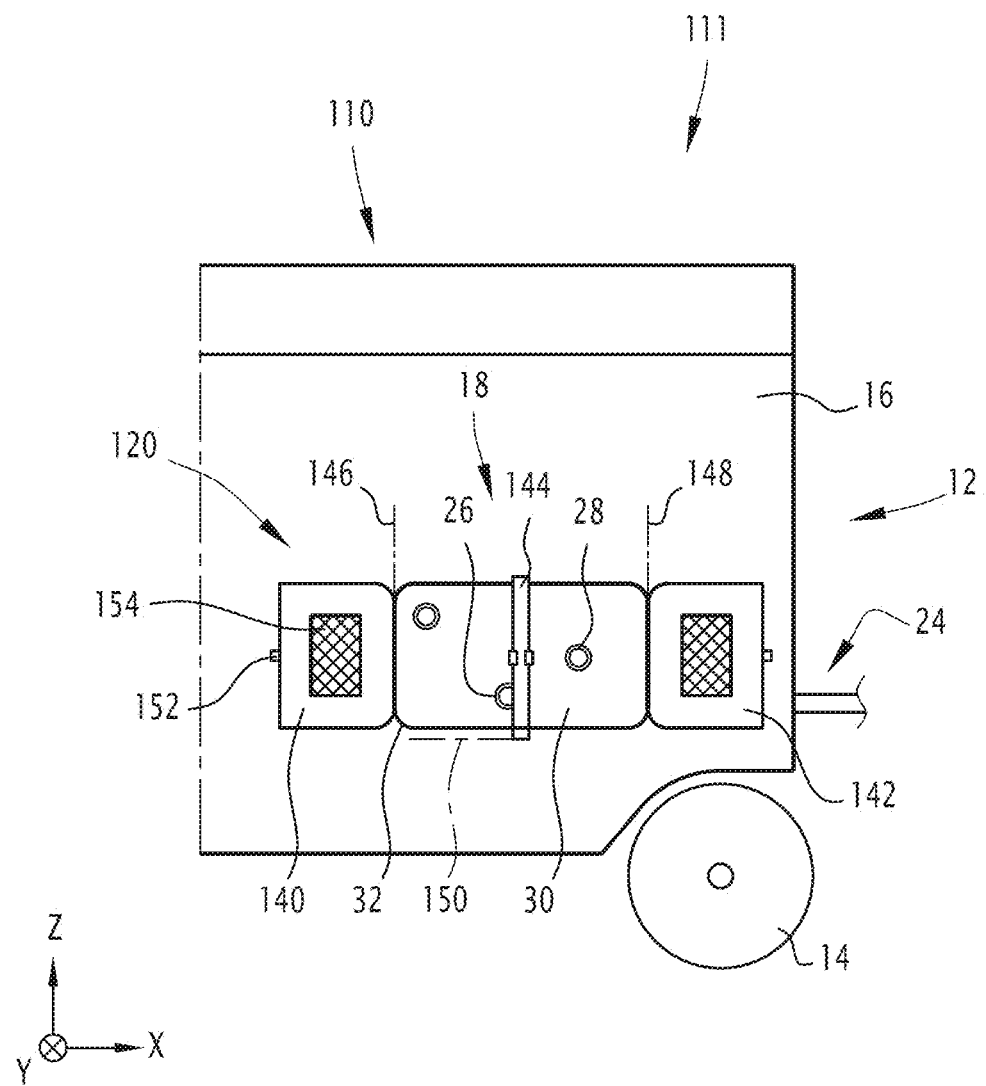
FIG. 2 is a lateral schematic view of a land vehicle according to a second embodiment of the invention, in a second configuration.

FIGS. 1 and 2 show detail views, respectively, of a land vehicle 10 according to a first embodiment of the invention; and of a land vehicle 110 according to a second embodiment of the invention.

In the illustrated embodiment, the land vehicle 10, 110 is a rail vehicle 11, 111, such as a train or tram. Such a rail vehicle 11, 111 has, for example, several similar cars 10, 110 connected to each other.

Alternatively, the land vehicle 10, 110 is a bus-type road vehicle.

In the following description, vehicles 10 and 110 will be described together, with common elements designated by the same reference numbers.

The land vehicle 10, 110 comprises a body 12 and a plurality of wheels 14 which are rotatable relative to the body.

Consider an orthonormal basis (X, Y, Z) associated with the body 12, with the Z direction representing the vertical. The body extends in the horizontal direction X, called the longitudinal direction, corresponding to a direction of travel of the land vehicle 10, 110.

The body 12 comprises in particular: a side wall 16; a technical compartment 18; and a device 20, 120 for closing said technical compartment.

The side wall 16 extends along the longitudinal direction X. Preferably, said side wall is substantially vertical.

The technical compartment 18 is for example intended for the maintenance of at least one hydraulic circuit 24 of the vehicle 10, 110. The technical compartment 18 contains, for example, one or more drain and/or flush valves 26, 28.

In case the land vehicle 10, 110 is a rail vehicle car 11, 111 comprising several similar cars, the hydraulic circuit 24 preferably extends over several cars of said rail vehicle 11, 111.

The technical compartment 18 is located inside the body 12 and has an opening 30 (FIG. 2) into the side wall 16.

In the embodiment, the opening has a substantially rectangular edge 32 (FIG. 2) with horizontal sides 34 and vertical sides 36 (FIG. 1).

The closing device 20, 120 is suitable for reversibly closing the technical compartment 18. More specifically, the closing device 20, 120 is movable between a closed configuration, visible in FIG. 1, and an open configuration visible in FIG. 2.

In the closed configuration, the closing device 20, 120 obstructs the opening 30 of the technical compartment 18. In the open configuration, the closing device 20, 120 provides access to the interior of said technical compartment 18, including the valves 26, 28.

The closing device comprises: a first 40, 140 and a second 42, 142 flap; and a central element 44, 144.

Preferably, each of the first flap 40, 140, the second flap 42, 142 and the central element 44, 144 has a height along Z substantially equal to the height of the vertical sides 36 of the edge 32.

The first 40, 140 and second 42, 142 flaps are aligned along the longitudinal direction X. As will be detailed below, the first flap 40, 140 is rotatable relative to the body 12, along a first substantially vertical axis 46, 146. Similarly, as will be detailed below, the second flap 42, 142 is rotatable relative to the body 12, along a second substantially vertical axis 48, 148.

The central element 44, 144 is arranged between the first 40, 140 and second 42, 142 flaps in the longitudinal direction X.

Said central element is joined to the edge 32 of the opening 30 of the technical compartment 18. Specifically, the central element 44, 144 is joined to the horizontal sides 34 of the edge 32.

In a first embodiment, as shown in FIG. 1, the central element 44 is a rectangular panel. According to a second embodiment, as shown in FIG. 2, the central element 144 is a beam arranged substantially vertically.

According to the first embodiment, as shown in FIG. 1, the central element 44 is attached to each of the horizontal sides 34 of the edge 32, with removable screw-type fasteners.

According to the second embodiment, as shown in FIG. 2, a first end of the central element 144 is hinged to the side wall 16 of the body 12, along a third axis of rotation 150 parallel to X. A second end of said central element 144 is attached to the side wall 16 with removable screw-type fasteners. Preferably, the third axis of rotation 150 is located below the opening 30.

According to the first embodiment, at least one of the first 40 and second 42 flaps is hinged to the central element 44. In the embodiment shown in FIG. 1, each of the first 40 and second 42 flaps is hinged to the central element 44, for example by means of hinges embodying the first 46 and second 48 axes of rotation. In addition, each of the flaps 40, 42 is provided with a member 52 for releasable fastening to the edge 32 of the opening 30. Said fastening member 52 is for example a latch.

According to the second embodiment, at least one of the first 140 and second 142 flaps is hinged to the edge 32 of the opening 30. In the embodiment shown in FIG. 2, both the first 140 and second 142 flaps are hinged to the central element 32, for example by means of hinges embodying the first 146 and second 148 axes of rotation. Each of said first 146 and second 148 axes is substantially aligned with a vertical side 36 of the edge 32.

In addition, each of the flaps 140, 142 is provided with a member 152 for removable fastening to the central element 144. Said fastening member 152 is for example a latch.

Alternatively, and not shown, either the first or second flap is hinged to the central element; and the other of the first and second flaps is hinged to the side wall of the body.

Preferably, at least one of the first 40, 140 and second 42, 142 flaps is movable about its axis of rotation 46, 146, 48, 148 with an amplitude of approximately 180°.

Specifically, in the embodiment shown in FIG. 2, each of the flaps 140, 142 may be folded back into contact with the side wall 16 in the open configuration of the closing device 120.

In the embodiment shown in FIG. 1, in the open configuration of the closing device 20, at least one of the flaps 40, 42 may be folded against the central element 44. In the illustrated embodiment, the width along X of the central element 44 allows only one flap 40, 42 to be folded down at a time onto said central element. Alternatively, and not shown, with a wider central element, both flaps 40, 42 can be folded down onto the central element simultaneously.

Optionally, the closing device 20, 120, comprises air vents 54, 154 for ventilating the technical compartment 18 in the closed configuration of said device. The air vents 54, 154 are for example formed by a grid or by louvers.

The air vents 54, 154 are supported by at least one of the first 40, 140 or second 42, 142 flaps and/or by the central element 44, 144. In the embodiment shown in FIG. 1, the central element has louver-like air vents 54. In the embodiment shown in FIG. 2, each of the flaps 140, 142 has grid-type air vents 154.

A method of operating the land vehicle 10, 110 and the closing device 20, 120 will now be described. During movement of the vehicle 10, 110, the closing device 20, 120 is in the closed configuration and the fasteners 52, 152 hold the flaps 40, 140, 42, 142 in contact with the edge of the opening 30 or in contact with the central element 44, 144.

If a latch 52, 152 fails, a flap 40, 140, 42, 142 that opens unexpectedly is folded back against the side wall 16 or against the central element 44, 144. The form factor around the land vehicle 10, 110 in a transverse direction Y is therefore contained within a limit provided for by the traffic regulations of said vehicle.

In order to access the valves 26, 28 to service the hydraulic system 24, an operator unlocks the latches 52, 152 to open the first 40, 140 and/or the second 42, 142 flaps.

To access a valve 26 that may be obstructed by the central element 44, 144, the operator may also detach the removable fasteners connecting said central element to the side wall 16. In the embodiment shown in FIG. 2, the operator removes the screws securing the second end of the beam 144 to the edge 32 of the opening 30. The operator then rotates said beam 144 about the third axis of rotation 150, in order to access the valve 26.

Once the maintenance operations have been completed, the operator screws the central element 44, 144 back into the edge 32 of the opening 30. The operator then locks the latches 52, 152 again to return the closing device 20, 120 to the closed configuration.

The land vehicle 10, 110 as described above allows easy access to the technical compartments, while avoiding overrunning in the event of a flap being opened unintentionally, particularly when the vehicle is moving. The shutters are simply hinged, without the need for opening cylinders.

What is claimed is:

1. A land vehicle comprising a body, said body comprising:

a substantially vertical outer wall, said outer wall extending in a horizontal longitudinal direction (X) corresponding to a direction of travel of the land vehicle;

a technical compartment having an opening into said outer wall, the opening having a substantially rectangular edge with horizontal sides and vertical sides; and at least one closing device capable of reversibly closing the technical compartment, said closing device being movable between an open configuration and a closed configuration;

the closing device comprising:

a first and second flap, aligned in the longitudinal direction; both flaps being rotatable with respect to the outer wall of the body, along a substantially vertical axis; and a central element, connected to the edge of the opening of the technical compartment, said central element being disposed between the first and second flaps in the longitudinal direction;

wherein, in the closed configuration of the closing device, in which both the first and second flaps extend in the longitudinal direction, a first and a second end of both of said flaps in said longitudinal direction is in contact with the outer wall of the body and the central element, respectively, such that said first and second flaps and the central element obstruct the opening of the technical compartment;

wherein, in the open configuration of the closing device, the first and second flaps are folded against the outer wall or against the central element, so as to give access to the technical compartment;

the central element being hinged to the outer wall of the body such that the central element is removably attached to the outer wall of the body.

2. The land vehicle according to claim 1, wherein at least one of the first and second flaps is hinged to the central element.

3. The land vehicle according to claim 2, wherein the at least one flap hinged to the central element has a member for releasable fastening to the outer wall of the body.

4. The land vehicle according to claim 1, wherein at least one of the first and second flaps is hinged to the outer wall of the body.

5. The land vehicle according to claim 4, wherein the at least one flap hinged to the outer wall has a member for releasable fastening to the central element.

6. The land vehicle according to claim 1, wherein the central element is a panel.

7. The land vehicle according to claim 1, wherein the central element is a beam.

8. The land vehicle according to claim 1, wherein at least one of the first or second flaps and/or the central element comprises air vents of the technical compartment.

9. The land vehicle according to claim 1, wherein the central element is hinged to the outer wall along a horizontal axis.

* * * * *